United States Patent [19]

Choi et al.

[11] Patent Number: 6,057,379
[45] Date of Patent: May 2, 2000

[54] METHOD OF PREPARING POLYIMIDE FOAM WITH EXCELLENT FLEXIBILITY PROPERTIES

[75] Inventors: Kil Y. Choi; Jae H. Lee; Sung G. Lee; Mi H. Yi, all of Daejeon; Seung S. Kim, Seoul, all of Rep. of Korea

[73] Assignee: Korea Research Institute of Chemical Technology, Rep. of Korea

[21] Appl. No.: 09/338,922

[22] Filed: Jun. 23, 1999

[30] Foreign Application Priority Data

Jul. 25, 1998 [KR] Rep. of Korea ............... 98 30014

[51] Int. Cl.$^7$ .................. C08J 9/00; C08J 9/02
[52] U.S. Cl. ................. 521/184; 521/185; 521/189
[58] Field of Search ..................... 521/184, 185, 521/189

[56] References Cited

U.S. PATENT DOCUMENTS

| | | | |
|---|---|---|---|
| 4,647,597 | 3/1987 | Shulman et al. | 521/184 |
| 4,656,198 | 4/1987 | Shulman et al. | 521/184 |
| 4,670,478 | 6/1987 | Shulman et al. | 521/184 |
| 4,897,432 | 1/1990 | Lee et al. | 521/184 |
| 4,994,501 | 2/1991 | Shulman | 521/184 |

*Primary Examiner*—Morton Foelak
*Attorney, Agent, or Firm*—Whitham, Curtis & Whitham

[57] ABSTRACT

A method of preparing polyimide foam produces a foam with excellent flexibility properties. The method of preparing polyimide foam is performed by foaming polyimide percursor which is prepared by employing linear aliphatic diamine and aromatic diamine containing 4 to 12 carbon atoms, at specific weight ration into the esterified reaction mixture prepared by reacting an aromatic carboxylic acid or its anhydride with excess amount of an alcohol compound. The polyimide foam produced by the method described retins superior characteristics of conventional polyimide foams and in addition have excellent flexibility so that it is used widely as adiabatic material, acoustical absorbent and cushion material in the aerospace industry, submarine and express trains etc.

8 Claims, No Drawings

METHOD OF PREPARING POLYIMIDE FOAM WITH EXCELLENT FLEXIBILITY PROPERTIES

BACKGROUND OF THE INVENTION

1. Field of the Invention

The present invention relates to a method of preparing polyimide foam with excellent flexibility properties and more particularly, to a method of preparing polyimide foam with excellent flexibility by foaming polyimide precursor which is prepared by employing linear aliphatic diamine and aromatic diamine containing 4 to 12 carbon atoms, at specific weight ratio into the esterified reaction mixture prepared by reacting an aromatic carboxylic acid or its anhydride with excess amount of an alcohol compound.

2. Description of the Prior Art

"Polymer foam" refers to a light substance in which the cells within the polymer are well distributed with low density. The foam is widely used as adiabatic, cushion, shock absorbent, soundproof and packing materials due to its excellent cushion, adiabatic, soundproof and vibration-proof properties. The general purpose foams such as polyurethane or polyolefin foams are widely used in transportation equipment such as automobile and ships due to their superior physical properties such as strength, restoring capacity and adiabatic and economic efficiency. However, for a use in aerospace, submarine, special ships and express train, which require superior heat-resistance and flame retardancy, a special heat-resistance foam with superior heat-resistance and flame retardancy properties is used therein. With an aromatic or heterocyclic structure, typical heat-resistance foams include polyimide, polyisocyanurate and polybenzimidazole with high heat-resistance. In particular, the polyimide foam is known to have a wide application due to its superior thermal stability and flame retardancy.

Methods for preparing polyimide-based foams are disclosed in U.S. Pat. Nos. 4,241,114, 4,241,193, 4,273,886, 4,296,208, 4,305,796 and 4,332,656. These methods include a foaming by means of heating a polyimide in an oligomer condition in an oven or microwave oven. However, the problem of a difficulty in control of the physical properties arose in which a chain extension reaction and foaming reaction occur simultaneously.

Further, U.S. Pat. No. 4,319,000 discloses that 3,3',4,4'-benzophenone tetracarboxylic acid dianhydride (BTDA) and ethyl alcohol as esterifying agent were used to control amount of the closed cell to be below 95% and two types of aromatic amines having a base dissociation constant lower than $10^{-10}$ were selected from the group consisting of 4,4'-diaminodiphenylsulfone, 3,3'-diaminodiphenylsulfone, and 2,6-diaminopyridine (2,6-DAP).

U.S. Pat. No. 4,369,261 discloses that BTDA, methylenedianiline (MDA), 2,6-DAP, and an activated carbon or graphite with superior conductivity were used to prepare a polyimide foam with improved flexibility, homogeneous cell structure.

U.S. Pat. Nos. 4,647,597, 4,656,198 and 4,670,478 disclose that using BTDA, MDA, and 2-methoxyethanol as a plasticizer were used to prepare a polyimide foam.

U.S. Pat. Nos. 4,806,573, 4,824,874 and 4,830,883 disclose not only the method for preparing a polyimide precursor by reacting BTDA, organic polyisocyanate and furfuryl alcohol but also a way of using precursor as a reinforcement agent of a foam with an open cell structure.

U.S. Pat. No. 4,952,611 discloses that a polyimide foam with superior compression set property for a use in seat cushion, was prepared by using a mixture of BTDA and 2-(vicynal-dicarboxycyclohexenyl)succinic acid in addition to an amine selected from methylenedianiline or 2,6-diaminopyridine.

U.S. Pat. No. 4,978,692 discloses that 3,3',4,4'-benzophenonetetracarboxylic acid and an amine selected from the group consisting of 4,4'-bis[4-(3-aminophenoxy)phenyl]sulfide, 4,4'-bis[4-(3-aminophenoxy)phenyl]sulfone, and 4,4'-bis(3-aminophenoxy)benzophenone were used in order to obtain a cell size of 0.1 to 1.0 mm in a polyimide foam.

U.S. Pat. No. 5,234,966 discloses a method of preparing a polyimide foam of desired density depending on the water content by reacting BTDA, MDA, 2,6-DAP, and the mixture of alcohol compound and water as a esterifying agent.

Polyimide foams prepared by previous methods show some physical improvement in heat-resistance, flame retardancy, but still nearly no improvement in flexibility.

Therefore, it is required to provide an improved method for preparing a polyimide foam with flexibility as well as its physical properties such as flame retardancy and heat-resistance.

SUMMARY OF THE INVENTION

The inventors et al. have made intensive efforts to prepare said polyimide foam with improving flexibility, retaining physical properties like flame retardancy. As a result of this, this invention has been completed by foaming the polyimide precursor under desired condition produced by imidization of the amine essentially containing linear aliphatic diamines with the esterified solution prepared by reacting an aromatic carboxylic acid or its anhydride with an alcohol compound.

The objective of this invention lies in providing a method of preparing the polyimide foam with an excellent improvement in flexibility so that it can be useful as adiabatic material, acoustical material and cushion material in aerospace industry, submarine, special ship, express train and etc.

DETAILED DESCRIPTION OF THE INVENTION

The polyimide precursor is produced by imidization of the amine compounds with esterified compounds prepared by reacting an aromatic carboxylic acid or its anhydride with an alcohol compound. The polyimide foam, thus prepared, shows excellent flexibility by using amine compounds represented in the following formula I which have the molar ratio of linear aliphatic diamine to aromatic diamine in the range of 0.01~0.3 to 0.7~0.99.

$$H_2N-(CH_2)_n-NH_2 \qquad (1)$$

wherein, n is an integer of 4 to 12.

A detailed description of this invention is as follows.

The polyimide foam is normally prepared by foaming the polyimide precursor prepared by imidization of proper amine compound with esterified compound prepared by reacting an carboxylic acid or its anhydride with an alcohol compound. In order to obtain the polyimide foam with superior heat-resistance and flame retardancy, aromatic diamines have been used as compound. On the other hand, the use of an aliphatic amine have been restrained due to the loss of heat-resistance and flame retardancy of the resulting foams.

The main objective of this invention is to improve the flexibility of the polyimide foams by using polyimide precursor produced by using aromatic diamines and an appropriate quantity of linear diamine represented in the following formula 1. Specially, a linear aliphatic diamine with carbon atoms 4 to 12 has been used. In case the number of carbon atoms is less than four, it is impossible to obtain the desired object of this invention due to the insufficiency of flexibility. In case the number of carbon atoms is more than twelve, it is also impossible to obtain the desired object due to loss of heat-resistance property. Also because the physical properties of prepared polyimide foam are affected by the content of this linear aliphatic diamine, so it is recommendable to use the molar ratio of linear aliphatic diamine to aromatic diamine in the range of 0.01~0.3 to 0.7~0.99. If the content of a linear aliphatic diamine in all amine compound is below the limit, the additional effect is nearly negligible. If the content of linear aliphatic diamine in all amine compound exceeds the limit, the heat resistance and flame retardancy properties of prepared final polyimide foam significantly reduce.

A more detailed explanation for the method for preparing polyimide precursor and the polyimide foam is as given below;

The initial process is the esterification of an aromatic carboxylic acid or its anhydride with excess alcohol compound.

An aromatic carboxylic acid or its anhydride is selected from conventionally available ones and preferably, 3,3',4,4'-benzophenonetetracarboxylic acid or its anhydride.

An alcohol compound used as an esterifying agent is preferable to use aliphatic univalent alcohol compound containing 1 to 6 carbon atoms in the view of reactivity. Alcohol compound is selected from the group consisting of methyl alcohol, ethyl alcohol, n-propyl alcohol, isopropyl alcohol, butyl alcohol, isobutyl alcohol, 2,3-butyl alcohol, n-pentyl alcohol, and n-hexyl alcohol. Molar ratio of said alcohol compound to aromatic carboxylic acid or its anhydride is maintained in the range of 6 to 20. If the content of alcohol compound is beyond above-mentioned limit, the esterification of aromatic carboxylic acid or its anhydride is carried out at a unduly slow rate and is not proceeded completely.

Next process is imidization reaction by adding amine compound and catalyst in the prepared esterified compound.

As mentioned above, amine compound used in this invention is a mixture of a linear aliphatic diamine compound within certain weight percent and conventional aromatic diamine compound. This amine compound is employed with aromatic carboxylic acid or its anhydride at equimolar amount. Aromatic diamine is at least one selected from the group consisting of 3,3'-diaminodiphenylsulfone, 4,4'-diaminodiphenylsulfone sulfide, 4,4'-diaminodiphenylsulfide, 3,3'-diaminodiphenyl ether, 4,4'-diamino diphenylether, m-phenylenediamine, p-phenylenediamine, and p,p'-methylene dianiline.

In this invention, it is preferred in view of reaction rate to use heterocyclic amine catalyst as reaction catalyst. A heterocyclic amine is one selected from the group consisting of isoquinoline, quinoline, imidazole, 1-methylimidazole, 2-methylimidazole, 4-methylimidazole, pyrrole, pyrazole, indole, pyridazine and pyrimidone. It is preferred that the mole percent of heterocyclic amine catalyst to aromatic carboxylic acid or its anhydride is maintained in the range of 0.01 to 10. If the mole percent is below 0.01, heterocyclic amine can not play sufficient role as a catalyst in preparing polyimide precursor. As such, the polyimide foam prepared with such polyimide precursor is unduly hard and easily breakable. On the other hand, if mole percent exceeds 10, the molecular weight of prepared polyimide precursor is too large so that it is impossible to obtain polyimide foam from foaming process.

In this invention, a non-ionic surfactant containing fluorine represented in the following formula 2 is used to stabilize the cell structure much more than other surfactants. The amount of said surfactant to the total amount of aromatic carboxylic acid or its anhydride and diamine is maintained in the range of 0.02 to 2 wt %. If the amount of surfactant is less than 0.02 wt %, it is impossible to obtain the cell structure of homogeneous size and distribution. If it exceeds 2 wt %, the polyimide foam as final product has poor flame retardancy.

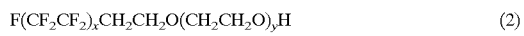

$$F(CF_2CF_2)_xCH_2CH_2O(CH_2CH_2O)_yH \qquad (2)$$

wherein, x is an integer of 1 to 7 and y is 0 or an integer of 1 to 25.

Then, the polyimide precursor in solid phase is prepared by removing excess of alcohol with the rotary evaporator. The particle size of said powder is controlled to 300 $\mu$m or less by using a sieve. If the particle size of powder is larger than 300 $\mu$m, the cell structure of prepared foam becomes so large that mechanical properties are lost. Thereafter, it is placed in an oven with reduced pressure at a temperature of 40 to 60° C. to completely remove alcohol therefrom.

The polyimide precursor has the intrinsic viscosity of 0.01 to 0.2 dl/g measured by dissolving dimethylacetamide at 30° C. If the intrinsic viscosity of the precursor is less than 0.01 dl/g or more than 0.2 dl/g, no foaming occurs at all.

After drying process, partial imidization through preheating and heating in microwave and micro cell foaming process are conducted. After placing the completely dried polyimide precursor onto the Teflon sheet, it is pre-heated for 1 to 30 minutes at 120° C. to 180° C. in a convection oven. If the pre-heating temperature is less than 120° C., the fluidity of the precursor is poor, which makes it impossible to obtain a homogeneous cell structure. If the temperature is above 180° C., the portion of precursor particles melt, thereby causing problems of getting homogeneous-poresized foam. Further, if the pre-heating time is less than 1 minute, the precursor particles are not sufficiently heated so that no foaming occurs. In the case of pre-heating time exceeds 30 min, the surface of the precursor is melted onto the Teflon board, thereby making it impossible to get a low density foam. Thereafter, the polyimide foam with an imidization level of 10 to 50% is prepared by controlling the on/off time of the microwave oven with micro frequency of 2450 MHz. If the polyimide foam has the degree of imidization of below 10%, polyimide foam has a tendency to be broken due to the uncompleted imidization even after post-curing process. In case of the degree of imidization exceeds 50%, polyimide foam has tendency to be hard.

Final process is post-curing at high temperature. This process is to increase mechanical properties of polyimide foam that is easily breakable due to its condition of simple foaming. Consequently, the polyimide is cured in a drying oven at 200~300° C. for 0.5 to 4 hours, thereby resulting in superior mechanical strength, flame retardancy and flexibility properties with the average cell size of 50 $\mu$m to 2 $\mu$m and the density of 3 to 25 kg/m³. If the post-curing temperature is less than 200° C., the resulting product is apt to break easily as imidization reaction has not proceeded sufficiently. If the temperature is more than 300° C., the surface melts and becomes oxidized, which causes deterioration of flexibility of the foam. Further, if the time of post-curing is less than 0.5 hour, the imidization does not sufficiently occur so that it is easily breakable. If it exceeds 4 hours, there is a problem caused by the partial oxidation of the foam. If the average pore size consisting of the foam is less than 50 μm or the density thereof is greater than 25 kg/m³, the rigidity becomes problematic. If the average pore size exceeds 2 mm or the density thereof is less than 3 kg/m³, mechanical strength is deteriorated.

The following examples illustrate various aspects of the invention herein but are not to be construed to limit the claims in any manner whatsoever.

EXAMPLE 1

To 1 l reactor equipped with an stirrer, temperature controller, nitrogen-inlet and condenser, nitrogen gas was slowly purged as 3,3',4,4'-benzophenonetetracarboxylic acid dianhydride (BTDA; 322.2 g, 1 mol) was added to 320 ml of methyl alcohol (8 mol). The reaction mixture was heated at reflux for 100 minutes to esterify BDTA. As the esterification of the solution was carried out, the suspension therein became a clear solution. The reaction mixture was cooled down to 50° C., and methylenedianiline(MDA; 192.3 g, 0.97 mol), hexamethylenediamine (HMDA; 3.5 g, 0.03 mol) and isoquinoline as a catalyst(IQ; 1.3 g, 0.01 mol) were added. Thereafter, the reaction mixture was heated at reflux for 10 minutes. Zonyl FSO 0.52 g (0.1 weight percent) manufactured by DuPont Co. Ltd in USA as a nonionic surfactant was added and stirred for 2 minutes to give polyimide precursor in solution.

Methyl alcohol was removed from the solution by means of rotary evaporator at 50° C. to yield a polyimide precursor in solid phase. Then, a sieve was used to homogeneously make the particle size below 300 μm. In order to completely remove methyl alcohol from the precursor, it was placed in an oven under reduced pressure and re-dried for 3 hours at 60° C. The yielded precursor was dissolved in dimethylacetamide at 0.5 g/dl and the intrinsic viscosity therefrom was determined to be 0.03 g/dl at 30° C. 10 g of completely dried polyimide precursor particles were placed onto the Teflon board and were pre-heated in a drying oven at 140° C. for 10 minutes, after which was placed in a microwave oven with a frequency of 2,450 MHz. The foaming was carried out for 10 minutes with the on/off control set at 60/30 seconds. The yielded polyimide foam was cured in an oven at 260° C. for 2 hours to obtain a polyimide foam.

EXAMPLES 2 TO 13 AND COMPARATIVE EXAMPLES 1 TO 3

Performed in the manner of Experiment 1, except for the use of amine compounds and catalysts in the amounts as shown in table 1.

TABLE 1

Physical Properties of Polyimide Foam

| | Composition (mol) | | |
|---|---|---|---|
| examples | Aromatic diamine | Linear aliphatic diamine | catalyst |
| example | | | |
| 1 | MDA(0.97) | HMDA(0.03) | IQ(0.01) |
| 2 | MDA(0.95) | HMDA(0.05) | IQ(0.01) |
| 3 | MDA(0.90) | HMDA(0.10) | IQ(0.01) |
| 4 | MDA(0.85) | HMDA(0.15) | IQ(0.01) |

TABLE 1-continued

Physical Properties of Polyimide Foam

| | Composition (mol) | | |
|---|---|---|---|
| examples | Aromatic diamine | Linear aliphatic diamine | catalyst |
| 5 | MDA(0.80) | HMDA(0.20) | IQ(0.01) |
| 6 | MDA(0.90) | HMDA(0.10) | IQ(0.001) |
| 7 | MDA(0.90) | HMDA(0.10) | IQ(0.025) |
| 8 | MDA(0.90) | HMDA(0.10) | IQ(0.10) |
| 9 | MDA(0.90) | TMDA(0.10) | IQ(0.05) |
| 10 | MDA(0.90) | OMDA(0.10) | IQ(0.05) |
| 11 | MDA(0.90) | DMDA(0.10) | IQ(0.05) |
| 12 | MDA(0.90) | DADD(0.10) | IQ(0.05) |
| 13 | MDA(0.90) | HMDA(0.10) | 2-MID(0.05) |
| Comparative example | | | |
| 1 | MDA(1) | — | — |
| 2 | MDA(0.65) | HMDA(0.35) | IQ(0.05) |
| 3 | MDA(0.60) | HMDA(0.40) | IQ(0.05) |

MDA: methylenedianiline,
TMDA: tetramethylenediamine,
HMDA: hexamethylenediamine,
OMDA: octamethylenediamine,
DMDA: decamethylenediamine,
DADD: diaminododecane,
IQ: isoqunoline catalyst,
2-MID: 2-methylimidazole

EXPERIMENT

Physical properties of the polyimide precirsor and foams prepared according to Examples 1 to 13 and Comparative examples 1 to 3 were measured and is shown in table 2.

TABLE 2

| | Polyimide precursor | | Polyimide foam | | | |
|---|---|---|---|---|---|---|
| examples | Particle size (μm) | Viscosity (dl/g) | Tensile strength (kg/cm³) | Density (kg/m³) | Flexibility (%) | Flame retardancy (UL 94) |
| example | | | | | | |
| 1 | 275 | 0.03 | 0.91 | 11.1 | 65 | V-0 |
| 2 | 280 | 0.04 | 0.87 | 8.5 | 65 | V-0 |
| 3 | 290 | 0.04 | 0.85 | 12.1 | 68 | V-0 |
| 4 | 300 | 0.03 | 0.78 | 9.6 | 70 | V-0 |
| 5 | 300 | 0.05 | 0.77 | 10.5 | 72 | V-0 |
| 6 | 270 | 0.04 | 0.84 | 12.0 | 63 | V-0 |
| 7 | 250 | 0.03 | 0.82 | 9.8 | 63 | V-0 |
| 8 | 260 | 0.05 | 0.86 | 9.6 | 66 | V-0 |
| 9 | 270 | 0.06 | 0.68 | 12.0 | 60 | V-0 |
| 10 | 280 | 0.02 | 0.75 | 9.6 | 65 | V-0 |
| 11 | 280 | 0.03 | 0.74 | 8.2 | 70 | V-0 |
| 12 | 230 | 0.04 | 0.64 | 10.9 | 70 | V-0 |
| 13 | 260 | 0.04 | 0.61 | 13.0 | 65 | V-0 |
| Comparative example | | | | | | |
| 1 | 290 | 0.03 | 0.45 | — | 35 | V-0 |
| 2 | 260 | 0.05 | 0.38 | 12.8 | 60 | — |
| 3 | 270 | 0.02 | 0.32 | 13.6 | 65 | — |

(1) intrinsic viscosity: measured by dissolving dried polyimide precursor in dimethylactamide at a concentration of 0.5 g/dl at 30° C.
(2) tensile strength: measured by ASTM D 3574(E)
(3) density: measured by ASTM D 3574(A)
(4) flexibility : measured by ASTM D 3574(H) detecting the degree of bounding a ball with the diameter of 16 mm and the weight of 16.3 g after dropping to the surface of polyimide foam at 50 cm of height.

(5) flame retardancy: measured by testing with the V type of UL 94 and specimen with thickness 3.2 mm.

As displayed in table 2, polyimide foam prepared according to examples 1 to 13 shows excellent properties not only in terms of flexibility and flame retardancy but also in all other mechanical properties. These results are attributed to the use of linear aliphatic compounds as diamine compound and heterocyclic amine catalyst.

On the contrary, in the case of comparative example 1 which does not use linear aliphatic diamine and heterocyclic amine catalyst, tensile strength and flexibility have been found to be too low. Also in examples 2 and 3 in which the amount of aromatic diamine and linear aliphatic diamine is off the limit from the scope of this invention, it is found that tensile strength is very low, especially flame retardancy is extremely poor. Thus, in this invention, it is found that the amount of aromatic diamine and linear aliphatic diamine is very important factor contributing to the properties of the polyimide foam.

As explained and illustrated above, this invention provides for a method for preparing polyimide foam with excellent flexibility. Furthermore, the method of polyimide precursor mentioned in this invention allows production of polyimide precursor foam which retains superior characteristics of conventional polyimide foams and in addition have excellent flexibility. The polyimide foam produced by the method described in this invention can be used widely as adiabatic material, acoustical absorbent and cushion material in the aerospace industry, submarine and express trains etc.

What is claimed is:

1. A method for preparing polyimide foam with excellent flexibility, wherein imidization is carried by adding amine compound to the ester solution prepared by reacting an aromatic carboxylic acid or its anhydride with alcohol compound, and the polyimide precursor therefrom is foamed, characterizes that said amine compound represented in the following formula 1 is a mixture of linear aliphatic diamine and aromatic diamine in the mole ratio of 0.01~0.3:0.7~0.99

$$H_2N\text{---}(CH_2)_n\text{---}NH_2 \tag{1}$$

wherein, n is an integer of 4 to 12.

2. The method for preparing polyimide foam with excellent flexibility according to claim 1, wherein said imidization reaction is employed under heterocyclic amine catalyst selected from the group consisting of isoquinoline, quinoline, imidazole, 1-methylimidazole, 2-methylimidazole, 4-methylimidazole, pyrrole, pyrazole, indole, pyridazine, and pyrimidine.

3. The method for preparing polyimide foam with excellent flexibility according to claim 1, wherein said aromatic diamine is one or more than two aromatic diamines selected from the group consisting of 3,3'-diaminodiphenylsulfone, 4,4'-diaminodiphenylsulfone, 3,3'-diamino diphenylsulfide, 4,4'-diaminodiphenylsulfide, 3,3'-diaminodiphenylether, 4,4'-diaminodiphenylether, m-phenylenediamine, p-phenylenediamine, and p,p'-methylenediamine.

4. The method for preparing polyimide foam with excellent flexibility according to claim 1, wherein said aromatic carboxylic acid or its anhydride is 3,3',4,4'-benzophenonetetracarboxylic acid or its dianhydride.

5. The method for preparing polyimide foam with excellent flexibility according to claim 1, wherein said alcohol compound is an aliphatic univalent alcohol with 1 to 6 carbon atoms.

6. The method for preparing polyimide foam with excellent flexibility according to claim 1, wherein said foaming reaction is carried under the non-ionic surfactant containing fluorine represented in the following formula 2, $$F(CF_2CF_2)_xCH_2CH_2O(CH_2CH_2O)_yH \tag{2}$$

wherein, x is an integer of 1 to 7, and y is 0 or an integer of 1 to 25.

7. The method for preparing polyimide foam with excellent flexibility according to claim 1, wherein said polyimide precursor has the average particle size of 300 μm or less, and the intrinsic viscosity of 0.01 to 0.2 dl/g measured by dissolving in dimethylacetamide at a concentration of 0.5 g/dl at 30° C.

8. The method for preparing polyimide foam with excellent flexibility according to claim 1, wherein the density of the polyimide foam is 3 to 30 kg/m³, flexibility is more than 50%, and the average size of the cell is in the range of 50 μm to 2 mm.

* * * * *